United States Patent
Gratke et al.

(10) Patent No.: US 8,738,368 B2
(45) Date of Patent: May 27, 2014

(54) SPEECH PROCESSING RESPONSIVE TO A DETERMINED ACTIVE COMMUNICATION ZONE IN A VEHICLE

(75) Inventors: Jesse T. Gratke, Royal Oak, MI (US);
Gary M. Buch, Washington, MI (US);
Nathan D. Ampunan, Novi, MI (US);
Douglas C. Martin, Oxford, MI (US);
Bassam S. Shahmurad, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/362,316

(22) Filed: Jan. 31, 2012

(65) Prior Publication Data
US 2012/0197637 A1   Aug. 2, 2012

(51) Int. Cl.
*G01L 21/02* (2006.01)

(52) U.S. Cl.
USPC ............. 704/200; 704/225; 381/92; 455/519

(58) Field of Classification Search
USPC ............. 704/200, 225; 381/92; 455/519
See application file for complete search history.

(56) References Cited

U.S. PATENT DOCUMENTS

| | | | |
|---|---|---|---|
| 5,828,997 A * | 10/1998 | Durlach et al. | 704/233 |
| 2005/0221852 A1* | 10/2005 | D'Avello et al. | 455/518 |
| 2005/0221877 A1* | 10/2005 | Davis et al. | 455/575.9 |
| 2006/0013416 A1* | 1/2006 | Truong et al. | 381/119 |

* cited by examiner

*Primary Examiner* — Daniel D Abebe
(74) *Attorney, Agent, or Firm* — Anthony Luke Simon; Reising Ethington P.C.

(57) ABSTRACT

A system for and method of speech processing for a vehicle. Speech is received from at least one vehicle occupant via a plurality of microphones corresponding to the plurality of zones in the vehicle, wherein the microphones convert the speech into speech signals. At least one active communication zone is determined in which the at least one vehicle occupant corresponding to the active communication zone is speaking Speech processing is modified in response to the determined active communication zone.

27 Claims, 3 Drawing Sheets

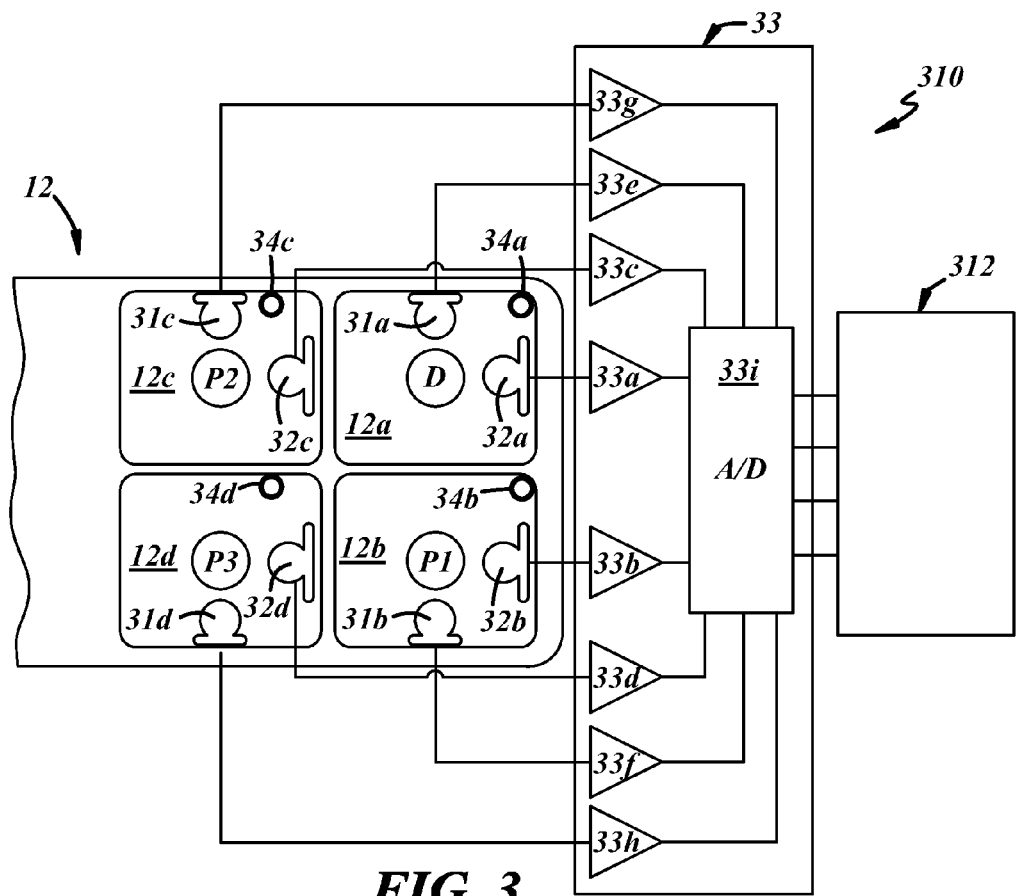
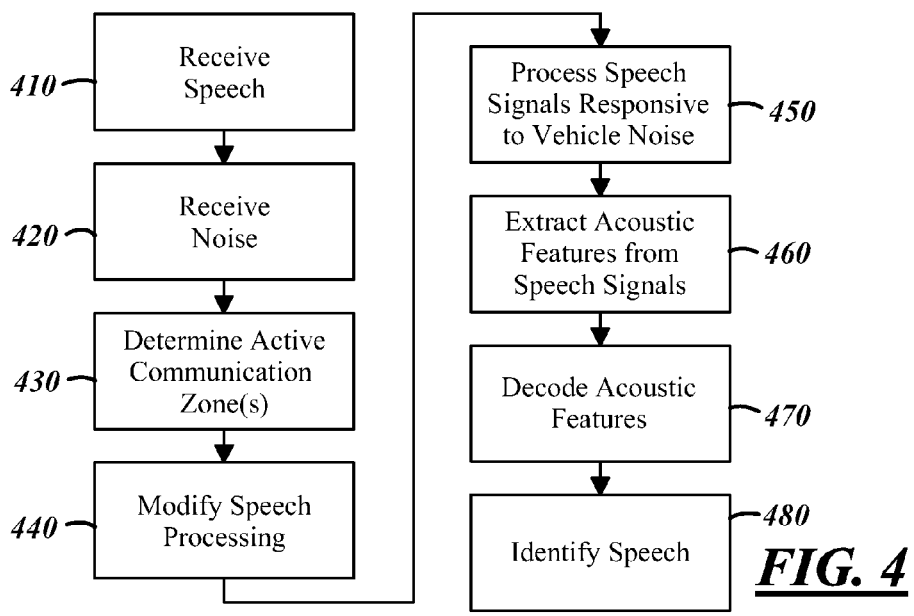
FIG. 3
FIG. 4

SPEECH PROCESSING RESPONSIVE TO A DETERMINED ACTIVE COMMUNICATION ZONE IN A VEHICLE

TECHNICAL FIELD

The present invention relates to speech signal processing and, more particularly, to speech recognition and hands-free telecommunication.

BACKGROUND

A feature used in vehicles includes automated speech recognition (ASR). ASR technology enables microphone-equipped computing devices to interpret speech and thereby provide an alternative to conventional human-to-computer input devices such as keyboards or keypads. For example, vehicle telecommunications devices can be equipped with voice dialing features enabled by an ASR system. The ASR system typically includes one or more microphones to receive speech from an occupant of a vehicle.

Another feature used in vehicles includes hands-free calling or hands-free telecommunication (HFT). HFT enables a user to initiate a telephone call by a push of a button and/or by ASR-enabled voice dialing, and enables the user to carry out the call without having to hold a telephone. In contrast to an ASR system, an HFT system is relatively sensitive to vehicle noise and, thus, typically includes a hands-free algorithm having parameters that are tuned for good performance in a particular vehicle cabin and under various vehicle operating conditions.

Microphones for ASR and HFT are usually located in a forward portion of a passenger compartment of the vehicle, such as in a rear view mirror assembly or in a headliner. Such a forward mounted microphone is satisfactory to enable reliable ASR and/or HFT for a driver. But the forward mounted microphone may not be satisfactory to enable reliable recognition of speech from other passengers in front and rear seating positions. Accordingly, some systems deploy a plurality of individual microphones in a vehicle interior; with one microphone and associated pushbutton located at each seating position. But this approach unnecessarily adds cost and complexity to the system.

A further feature used in vehicles includes active noise control (ANC) to reduce noise produced by vehicle engines, tires, ventilation systems, and the like. ANC systems may use a controller, microphones to sense objectionable noise and transmit the noise to the controller for processing and output of a cancellation waveform, and a speaker to receive the cancellation waveform and output the waveform to cancel the objectionable noise. ANC microphones are tuned to sense low frequency vehicle noise and, thus, are not considered suitable for use with ASR or HFT.

SUMMARY

According to an embodiment of the invention, there is provided a speech processing system for a vehicle having a plurality of zones. The system includes a plurality of microphones corresponding to the plurality of zones in the vehicle, and a controller in communication with the microphones. The controller receives vehicle occupant speech signals from at least one of the plurality of microphones, determines at least one active communication zone in which at least one vehicle occupant is speaking, and modifies speech processing in response to the active communication zone determination.

According to another embodiment of the invention, there is provided a method of speech processing for a vehicle having a plurality of zones. The method includes (a) receiving speech from at least one vehicle occupant via a plurality of microphones corresponding to the plurality of zones in the vehicle, wherein the microphones convert the speech into speech signals; (b) determining at least one active communication zone in which the at least one vehicle occupant corresponding to the active communication zone is speaking; and (c) modifying speech processing in response to the determined active communication zone.

BRIEF DESCRIPTION OF THE DRAWINGS

One or more embodiments of the invention will hereinafter be described in conjunction with the appended drawings, wherein like designations denote like elements, and wherein:

FIG. 3 is a block diagram depicting an embodiment of a speech processing system that can be used with the system(s) of FIG. 1 and/or FIG. 2; and FIG. 4 is a flow chart illustrating an embodiment of a speech processing method.

DETAILED DESCRIPTION OF THE ILLUSTRATED EMBODIMENT(S)

The following description describes an example communications system, example ASR and speech processing systems that can be used with the communications system, and one or more example methods that can be used with the aforementioned systems. The methods described below can be used by a vehicle telematics unit (VTU) as a part of recognizing speech uttered by a user of the VTU. Although the methods described below are such as they might be implemented for a VTU, it will be appreciated that they could be useful in any type of vehicle speech recognition system and other types of speech processing and/or recognition systems. For example, the methods can be implemented in mobile computing devices or systems, personal computers, or the like.

Communications System—

Figure 1:
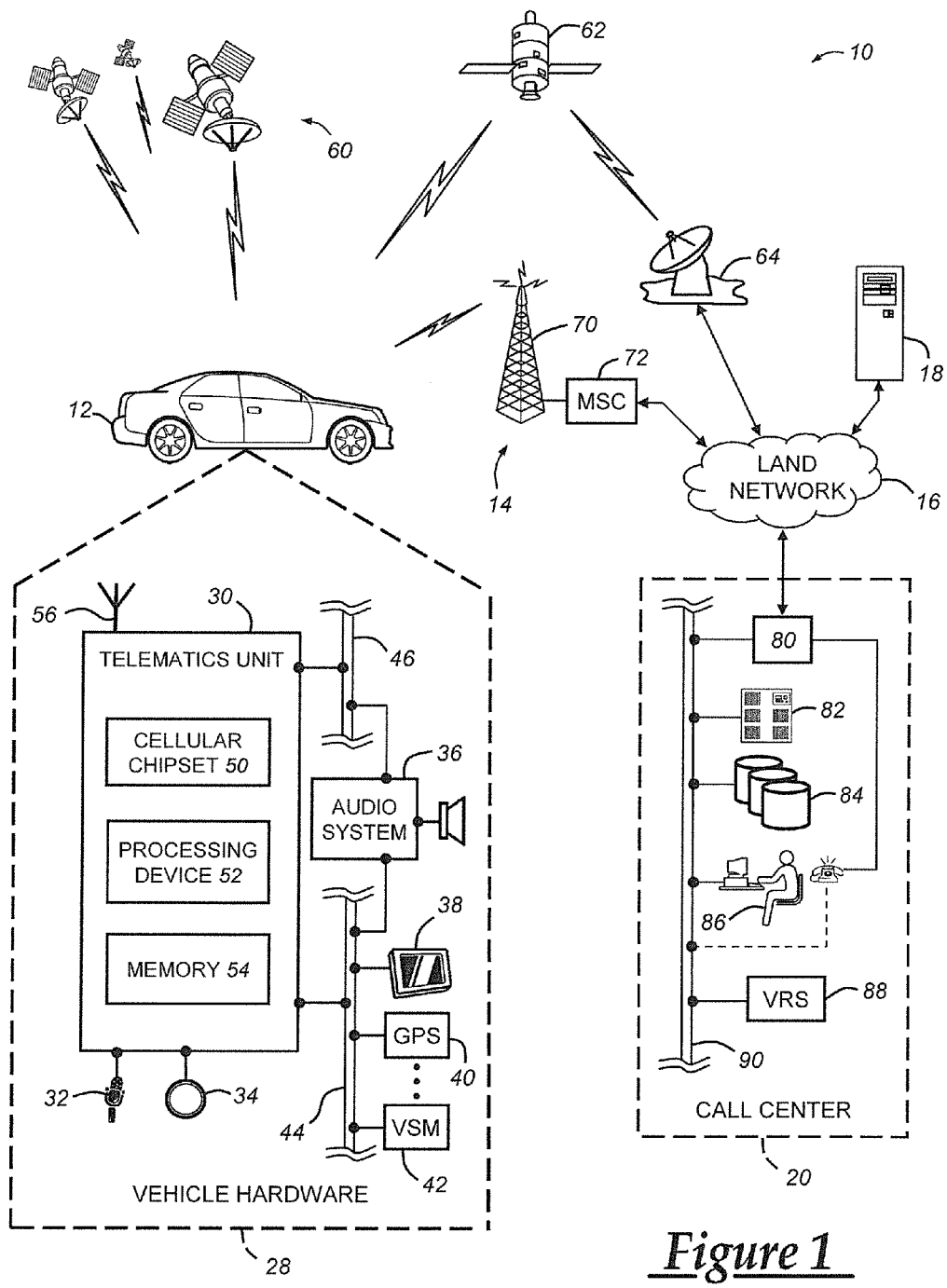
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the illustrative embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Automatic Speech Recognition System—

Figure 2:
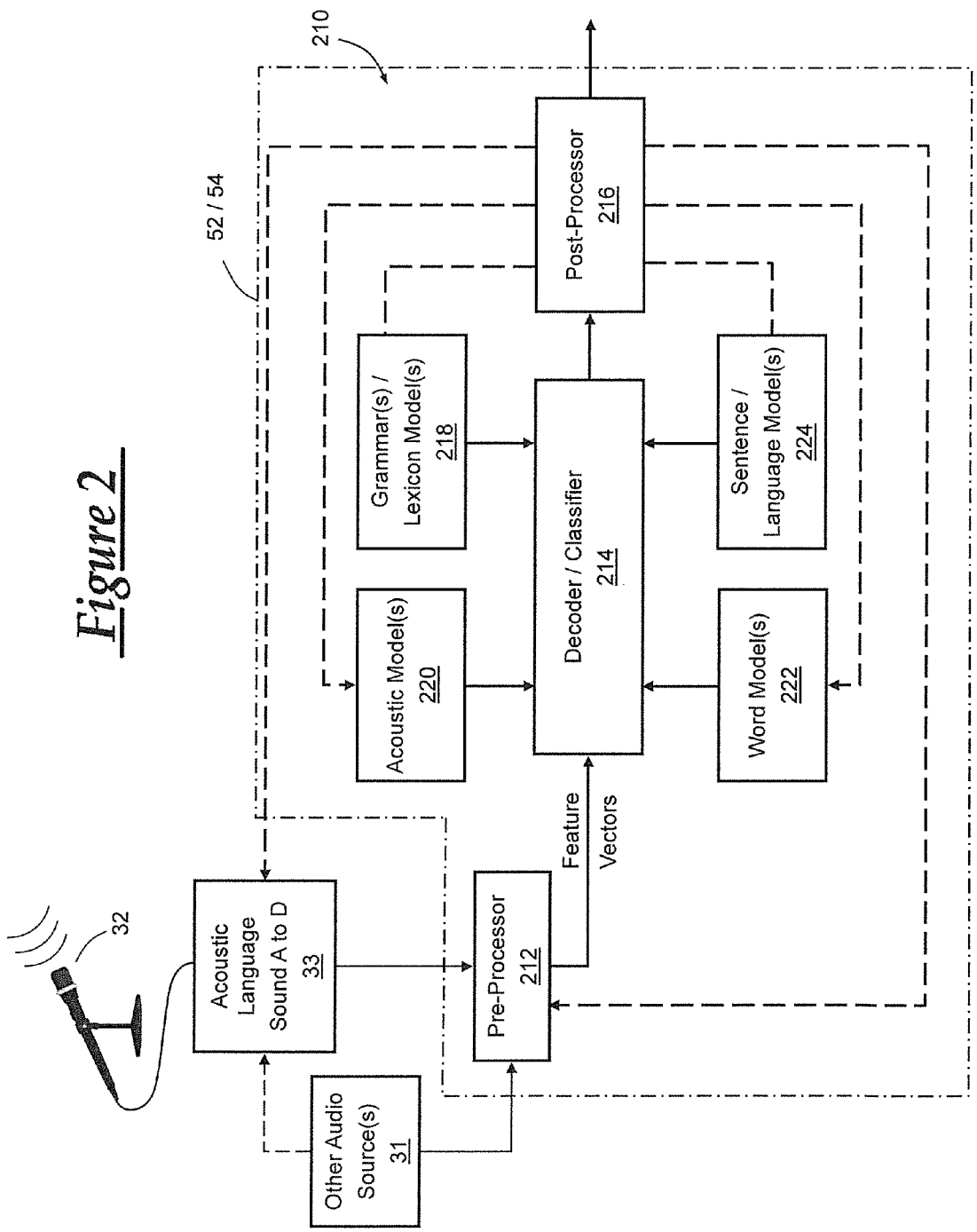
FIG. 2 is a block diagram depicting an embodiment of an automatic speech recognition system that can be used with the system of FIG. 1 and used to implement methods of speech recognition.

Turning now to FIG. 2, there is shown an illustrative architecture for an ASR system 210 that can be used to enable the presently disclosed method. In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

ASR systems are generally known to those skilled in the art, and FIG. 2 illustrates just one specific illustrative ASR system 210. The system 210 includes a device to receive speech such as the telematics microphone 32, and an acoustic interface 33 such as a sound card of the telematics unit 30 having an analog to digital converter to digitize the speech into acoustic data. The system 210 also includes a memory such as the telematics memory 54 for storing the acoustic data and storing speech recognition software and databases, and a processor such as the telematics processor 52 to process the acoustic data. The processor functions with the memory and in conjunction with the following modules: one or more front-end processors or pre-processor software modules 212 for parsing streams of the acoustic data of the speech into parametric representations such as acoustic features; one or more decoder software modules 214 for decoding the acoustic features to yield digital subword or word output data corresponding to the input speech utterances; and one or more post-processor software modules 216 for using the output data from the decoder module(s) 214 for any suitable purpose.

The system 210 can also receive speech from any other suitable audio source(s) 31, which can be directly communicated with the pre-processor software module(s) 212 as shown in solid line or indirectly communicated therewith via the acoustic interface 33. The audio source(s) 31 can include, for example, a telephonic source of audio such as a voice mail system, or other telephonic services of any kind One or more modules or models can be used as input to the decoder module(s) 214. First, grammar and/or lexicon model(s) 218 can provide rules governing which words can logically follow other words to form valid sentences. In a broad sense, a grammar can define a universe of vocabulary the system 210 expects at any given time in any given ASR mode. For example, if the system 210 is in a training mode for training commands, then the grammar model(s) 218 can include all commands known to and used by the system 210. In another example, if the system 210 is in a main menu mode, then the active grammar model(s) 218 can include all main menu commands expected by the system 210 such as call, dial, exit, delete, directory, or the like. Second, acoustic model(s) 220 assist with selection of most likely subwords or words corresponding to input from the pre-processor module(s) 212. Third, word model(s) 222 and sentence/language model(s) 224 provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech.

According to an alternative illustrative embodiment, some or all of the ASR system 210 can be resident on, and processed using, computing equipment in a location remote from the vehicle 12 such as the call center 20. For example, grammar models, acoustic models, and the like can be stored in memory of one of the servers 82 and/or databases 84 in the call center 20 and communicated to the vehicle telematics unit 30 for in-vehicle speech processing. Similarly, speech recognition software can be processed using processors of one of the servers 82 in the call center 20. In other words, the ASR system 210 can be resident in the telematics unit 30 or distributed across the call center 20 and the vehicle 12 in any desired manner.

First, acoustic data is extracted from human speech wherein a vehicle occupant speaks into the microphone 32, which converts the utterances into electrical signals and communicates such signals to the acoustic interface 33. A sound-responsive element in the microphone 32 captures the occupant's speech utterances as variations in air pressure and converts the utterances into corresponding variations of analog electrical signals such as direct current or voltage. The acoustic interface 33 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 33 converts the analog electrical signals into digital electronic signals. The digital data are binary bits which are buffered in the telematics memory 54 and then processed by the telematics processor 52 or can be processed as they are initially received by the processor 52 in real-time.

Second, the pre-processor module(s) 212 transforms the continuous stream of digital speech data into discrete sequences of acoustic parameters. More specifically, the processor 52 executes the pre-processor module(s) 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module(s) 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module(s) 214 to process the incoming feature vectors of each test pattern. The decoder module(s) 214 is also known as a recognition engine or classifier, and uses stored known reference patterns of speech. Like the test patterns, the reference patterns are defined as a concatenation of related acoustic frames and corresponding parameters. The decoder module(s) 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest.

In a similar manner, individual HMMs for a sequence of subwords can be concatenated to establish single or multiple word HMM. Thereafter, an N-best list of single or multiple word reference patterns and associated parameter values may be generated and further evaluated.

In one example, the speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of one or more words or subwords and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Illustrative parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module(s) 216 receives the output data from the decoder module(s) 214 for any suitable purpose. In one example, the post-processor software module(s) 216 can identify or select one of the reference patterns from the N-best list of single or multiple word reference patterns as recognized speech. In another example, the post-processor module(s) 216 can be used to convert acoustic data into text or digits for use with other aspects of the ASR system or other vehicle systems. In a further example, the post-processor module(s) 216 can be used to provide training feedback to the decoder 214 or pre-processor 212. More specifically, the post-processor 216 can be used to train acoustic models for the decoder module(s) 214, or to train adaptation parameters for the pre-processor module(s) 212.

Speech Processing System—

Turning now to FIG. 3, there is shown a speech processing system 310 that can be used for automatic or automated speech recognition (ASR) and/or hands-free telecommunication (HFT) in a passenger compartment of the vehicle 12. The passenger compartment may include a first zone 12a for a driver D, a second zone 12b for a first passenger P1, a third zone 12c for a second passenger P2, and a fourth zone 12d for a third passenger P3. As used herein, the term "zone" can include a seat, seating location, or the like. Accordingly, the zones can be vehicle occupant zones.

In general, the system 310 can include a plurality of microphones. For example, one or more speech microphones 32a, 32b, 32c, and/or 32d can be used to receive occupant or user speech and convert the user speech into speech signals. In another example, one or more active noise control microphones 31a, 31b, 31c, and/or 31d can be used to receive user speech and/or vehicle noise for conversion into user speech signals and/or vehicle noise signals, respectively. In any case, the plurality of microphones correspond to the plurality of zones 12a-12d in the vehicle 12. Also, the system 310 also can include one or more amplifiers 33a, 33b, 33c, 33d, 33e, 33f, 33g, and/or 33h to amplify the signals from corresponding microphones, and one or more analog to digital converters 33i to convert the amplified signals from analog form into digital form. The amplifiers 33a-33h and/or the analog to digital converter 33i can be part of the acoustic interface 33 of the telematics unit 30, or can be any other suitable device(s) to amplify and digitize analog signals into acoustic data signals. Further, the system 310 can include a speech controller 312 in communication with the microphones to receive and process the signals for any suitable use downstream.

The one or more speech microphones 32a-32d can include any suitable type(s) of speech microphones. The microphones 32a-32d can be positioned in front of the respective vehicle occupants (driver and passengers). In one example, the front microphones 32a, 32b can be carried in a headliner console, on sun visors, or A-pillars of the vehicle 12, above and in front of the first and second zones 12a, 12b, respectively. In another example, the rear microphones 32c, 32d can be positioned on a rear portion of driver and passenger seats, respectively, or on respective B-pillars of the vehicle 12, or in any other suitable location corresponding to the third and fourth zones 12c, 12d. The speech microphones 32a-32d can have a frequency response suitable for speech, for instance, from 300 Hz to 8 kHz. For example, the microphones can include conventional 0-8 kHz microphones or newer wideband 0-11 kHz microphones. Each of the microphones 32a-32d can include an individual directional or omnidirectional microphone, dual microphones, and/or the like.

The active noise control (ANC) microphones 31a-31d can include omnidirectional microphones or any other suitable ANC microphones. In one example, the microphones 31a-31d can be positioned laterally outboard of the speech microphones 32a-32d. In another example, the microphones 31a-31d can be positioned laterally outboard of and/or above the occupant seats. For instance, the microphones 31a-31d can be carried by any suitable portion of a headliner of the vehicle 12, wherein the microphones 31a-31d can be positioned to be above the ears of most vehicle occupants. As used herein, the terminology "ANC microphones" includes microphones having omnidirectional and phase correlated characteristics. The microphones should be in phase with one another so that anti-noise signals can be produced to be exactly 180° out of phase with the noise. The ANC microphones 31a, 31b can be tuned to sense low frequency vehicle noise, for example, by being tuned for sensitivity from 0-200 Hz.

The speech controller 312 can include any suitable portion(s) of the ASR system 210, the telematics processor 52 and memory 54, and/or any other suitable processing device(s) and memory. The speech controller 312 can process the signals for downstream use in recognizing speech during automated speech recognition, for communicating speech over a telecommunications system, and/or any other suitable purpose(s). In general, the controller 312 can receive vehicle occupant speech signals from at least one of the plurality of microphones, process the received speech signals to determine at least one active communication zone in which at least one vehicle occupant is speaking, and modify speech processing in response to the active communication zone determination.

Speech Processing Method—

Methods of speech processing can be carried out using suitable programming of the systems 210 and 310 of FIGS. 2 and 3 and within the operating environment of the vehicle telematics unit 30 as well as using suitable hardware and programming of the other components shown in FIG. 1. These features of any particular implementation will be known to those skilled in the art based on the above system description and the discussion of the method described below in conjunction with the remaining figures. Those skilled in the art will also recognize that the methods can be carried out using other ASR and speech processing systems and techniques within other operating environments.

Turning now to FIG. 4, there is provided a method 400 of speech processing for a vehicle having a plurality of zones, for example, the zones 12a-12d of the passenger compartment of the vehicle 12.

At step 410, the method includes receiving speech from a user or a vehicle occupant via one or more microphones corresponding to the plurality of zones in the vehicle, wherein the microphones convert the speech into speech signals. For example, one or more of the user speech microphones 32a-32d can be used. In another example, one or more of the vehicle noise microphones 31a-31d can be used. The plurality of zones can include at least two of a rear zone (which may include zones 12c and 12d), a front zone (which may include zones 12a and 12b), a left front zone 12a, a right front zone 12b a left rear zone 12c, or a right rear zone 12d.

At step 420, the method can include receiving vehicle noise via at least one active noise control microphone that converts the noise into vehicle noise signals. For example, one or more of the vehicle noise microphones 31a-31d can be used. The vehicle noise receiving step can be carried out during, or at the same time as the user speech receiving step. As used herein, the terminology "vehicle noise" includes sound that can be generated by a vehicle, for instance, powertrain sounds, tire/road sounds, and the like, or by wind impinging on a vehicle, or by sound sources external to the vehicle but audible within the vehicle.

At step 430, the method includes determining one or more active communication zones in which one or more occupants corresponding to the active communication zones is (or are) speaking In one embodiment, this step includes processing speech signals to determine the active communication zone(s). For example, the active communication zone(s) can be determined in response to relative strength of the speech signals received in step 410 from among the microphones. In another example, the active communication zone(s) can be determined for any corresponding microphone whose received speech signals exceed a predetermined level. In another embodiment, one or more of the vehicle occupants can manually input, via one or more buttons, touchscreens, or any other suitable user interfaces 34a, 34b, 34c, 34d coupled to the speech controller 312 in any suitable manner. Accordingly, any combination of the zones can be determined to be active. For example, one, all, or any quantity therebetween, of the zones can be determined to be active communication zones.

At step 440, the method includes modifying speech processing in response to the active communication zone(s) determination of step 430.

In one embodiment of step 440, the controller 312 can adjust a hands-free algorithm, and apply the adjusted algorithm to speech signals. For example, the hands-free algorithm can be adjusted by application of parameters tuned specifically for the determined active communication zone. As used herein, the terminology "hands-free algorithm" includes a speech processing algorithm having variables or parameters tuned specifically for hands-free telecommunication, and can be or can include a noise reduction algorithm. Also, the tunable variables or parameters can include noise reduction parameters, acoustic echo cancellation parameters, automatic gain control parameters, equalizer parameters, and the like. The speech signals can be the same speech signals received in step 410 and/or can be speech signals received subsequent to that step. In other words, speech modification can be carried out in real time or it can be delayed. In one example of this embodiment, the controller 312 can modify an already existing hands-free algorithm, or produce a new, better hands-free algorithm.

Parameters of the hands-free algorithm can be tuned for each of the plurality of zones. For example, echo cancellation parameters can be tuned for one or both zones 12c, 12d of the rear zone (12c, 12d) to account for delay in milliseconds from one or more loudspeakers in the front zone (12a, 12b) to one or more of the microphones in the rear zone. In another example, equalizer parameters can be tuned according to filter settings that result in good frequency response for the corresponding zone. In another example, equalizer parameters can include Gaussian curves having have center frequencies, bandwidths, and gain/attenuation. In a further example, noise reduction parameters can describe an amount of attenuation in dB from the speech signal. Also, the hands-free algorithm can be adjusted for only one of the zones at a time, all of the zones simultaneously, or the front zone or rear zone. In other words, the hands-free algorithm can be adjusted for many configurations of zones, such that the algorithm can be adjusted for one or more zones that are determined to be active communication zones. To illustrate, the hands-free algorithm can be adjusted specifically to include the parameters tuned for the front zone. In another illustration, the hands-free algorithm can be adjusted specifically to include the parameters tuned for the rear zone. The hands-free algorithm can also be adjusted and used for each individual passenger zone. It can also be adjusted and used for the whole vehicle, like a conference room call, wherein parameters are tuned for all zones.

In another embodiment of step 440, the controller 312 can switch between application of tuned hands-free algorithm parameters for a plurality of zones in response to the determined active communication zones. For example, the controller 312 can switch from application of parameters tuned specifically for a previously determined active communication zone, for example, the first zone 12a to application of parameters tuned for a presently determined active communication zone, for example, the fourth zone 12d. In another example, the controller 312 can switch from application of parameters tuned for a previously determined plurality of active communication zones, for example, the first and second zones 12a, 12b to application of parameters tuned for a presently determined plurality of active communication zones, for example, the third and fourth zones 12c, 12d.

In a further embodiment of step 440, the controller 312 can process speech signals received from only the determined active communication zone. For example, the controller 312 can ignore speech signals from speech microphones in each of the zones other than the determined active communication zone.

At step 450, the method can include processing the speech signals in response to the vehicle noise signals. In one example, the vehicle noise signals received from the ANC microphones 31a, 31b in step 420 can be used as a good model of actual vehicle noise.

In one embodiment of step 450, the speech signals can be processed using the vehicle noise signals to reduce vehicle noise in the speech signal. For instance, the controller 312 can be used to reduce vehicle noise in the speech signals by applying high pass filters, dynamic noise reduction, or any other suitable noise reduction techniques. Prior approaches to speech signal noise reduction typically involve applying pre-defined filters to the speech signal. But speech microphones are not usually tuned to sense low frequency vehicle noise. Accordingly, with the presently disclosed method, the ANC microphone(s) 31a, 31b can be used to reproduce the vehicle noise so that the controller 312 can process that vehicle noise out of the speech signal.

In another embodiment of step 450, a microphone mode can be adjusted in response to the received noise signals to reduce vehicle noise in the speech signals. For example, the controller 312 can deactivate, or ignore signals from, one or more speech microphones corresponding to zones whose corresponding ANC microphones are receiving a level of noise that exceeds a predetermined threshold.

In a further embodiment of step 450, the controller 312 can switch between microphone parameters in response to the noise signals to improve a signal to noise ratio. For instance, the controller 312 can activate the front microphones 32a, 32b and apply beamforming techniques to receive speech from the driver D in the first zone 12a if noise signals received from the corresponding ANC microphone 31a are below a predetermined level. In another case, for example, where the noise signals received from the ANC microphone 31a are above some predetermined level, the controller 312 can activate the front microphones 32a, 32b and apply dual microphone correlation techniques to the signals received from the speech microphones to reduce noise. For enhanced noise reduction using correlation techniques, a plurality of identical microphones can be used. The multiple identical microphones can pick up the same speech signal as well as any noise in the vehicle. Because noise signatures are typically incoherent and speech is typically coherent, correlation signal processing will tend to enhance coherent correlated speech and reduce incoherent noise. If identical microphones are not used, for example one directional and one omnidirectional, correlation techniques still can be used, but may not perform quite as well as the identical microphone case.

According to an ASR embodiment, steps 460 through 480 can be carried out.

At step 460, the speech signals can be processed to extract acoustic feature vectors from the audio. For example, the pre-processor 212 can also extract feature vectors including cepstral coefficients, pitch features, and the like.

At step 470, extracted acoustic feature vectors can be processed with a speech recognition engine or decoder to obtain at least one hypothesis for speech in the received audio. For example, the received speech signals can be decoded by the decoder 214 of the ASR system 210 using the grammar 218 and using one or more acoustic models 220 to produce N-best hypotheses and associated parameter values, for instance, confidence values.

At step 480, speech can be identified. For example, the post-processor 216 can be used to post-process the plurality of hypotheses produced from the decoder 214 to identify particular speech as the received speech. The identified speech hypothesis can be identified as the highest ranking hypothesis of a plurality of hypothesis based on probability or other statistical analysis or in any other suitable manner. For instance, the identified distortion hypothesis can be a first best of an N-best list of distortion hypotheses, or can be identified in any other manner similar to identification of subword or utterance hypotheses.

The methods or parts thereof can be implemented in a computer program product embodied in a computer readable medium and including instructions usable by one or more processors of one or more computers of one or more systems to cause the system(s) to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A speech processing system for a vehicle having a plurality of zones, comprising:
a plurality of microphones corresponding to the plurality of zones in the vehicle; and
a controller in communication with the microphones, wherein the controller receives vehicle occupant speech signals from at least one of the plurality of microphones, determines at least one active communication zone in which at least one vehicle occupant is speaking, and modifies speech processing in response to the active communication zone determination;
wherein the speech processing system includes an automated speech recognition system that recognizes driver speech input commands received via at least one of the microphones for control of one or more vehicle functions, and includes wireless communication capability that supplies occupant speech received via at least some of the microphones to be wirelessly transmitted for speech communication over a telecommunications system;
wherein the controller is operable to modify the speech processing using different hands-free parameters based on which one or more of the plurality of zones is determined to be the one or more active communication zones, and is operable to switch between the different hands-free parameters in response to determining a switch from a previously determined active communication zone to a presently determined active communication zone; and
wherein one of the previously determined active communication zone and the presently determined active communication zone can be a first one of the plurality of zones and the other of the previously determined active communication zone and the presently determined active communication zone can be a combination of the plurality of zones that includes the first zone.

2. The system of claim 1, wherein the at least one active communication zone is determined by manual input received from the at least one vehicle occupant.

3. The system of claim 1, wherein the at least one active communication zone is determined by processing the received speech signals.

4. The system of claim 1, wherein the plurality of microphones includes at least one of: a plurality of speech microphones or a plurality of active noise control microphones, and wherein the controller determines the at least one active communication zone in response to relative strength of the speech signals received from among the plurality of speech microphones.

5. The system of claim 1, wherein the controller determines a plurality of active communication zones in which occupants corresponding to the active communication zones are speaking.

6. The system of claim 1, wherein the controller modifies speech processing by adjusting a hands-free algorithm, and wherein the hands-free algorithm is adjusted by application of parameters tuned specifically for the determined active communication zone.

7. The system of claim 1, wherein the controller modifies speech processing by adjusting a hands-free algorithm, and wherein the hands-free algorithm is adjustable for any configuration of the plurality of zones, such that the controller switches between application of tuned hands-free algorithm parameters for a plurality of zones in response to the determined active communication zones.

8. The system of claim 1, wherein the controller modifies speech processing by processing speech signals received from only the determined active communication zone.

9. The system of claim 1, wherein the plurality of microphones includes a plurality of speech microphones that convert vehicle occupant speech into the vehicle occupant speech signals and a plurality of active noise control microphones that convert vehicle noise into vehicle noise signals, and wherein the controller:
receives the vehicle noise signals and processes the speech signals in response to the vehicle noise signals,
adjusts a microphone mode in response to the received noise signals to reduce vehicle noise in the speech signals by deactivating at least one of the plurality of speech microphones.

10. The system of claim 1, wherein the plurality of microphones includes a plurality of speech microphones that convert vehicle occupant speech into the vehicle occupant speech signals and a plurality of active noise control microphones that convert vehicle noise into vehicle noise signals, and wherein the controller:

receives the vehicle noise signals and processes the speech signals in response to the vehicle noise signals, adjusts a microphone mode in response to the received noise signals to reduce vehicle noise in the speech signals by switching between microphone parameters in response to the noise signals to improve a signal to noise ratio.

11. A speech processing system for a vehicle having a plurality of zones, comprising:

a plurality of microphones corresponding to the plurality of zones in the vehicle:
and
a controller in communication with the microphones, wherein the controller receives vehicle occupant speech signals from at least one of the plurality of microphones, determines at least one active communication zone in which at least one vehicle occupant is speaking, and modifies speech processing in response to the active communication zone determination;

wherein the plurality of microphones includes a plurality of speech microphones that convert vehicle occupant speech into the vehicle occupant speech signals and a plurality of active noise control microphones that convert vehicle noise into vehicle noise signals, and wherein the controller receives the vehicle noise signals and processes the speech signals in response to the vehicle noise signals, wherein the controller processes the speech signals using the vehicle noise signals to reduce vehicle noise in the speech signals.

12. A method of speech processing for a vehicle having a plurality of zones, comprising:

(a) receiving speech from at least one vehicle occupant via a plurality of microphones corresponding to the plurality of zones in the vehicle, wherein the microphones convert the speech into speech signals;

(b) determining at least one active communication zone in which the at least one vehicle occupant corresponding to the active communication zone is speaking;

(c) modifying speech processing in response to the determined active communication zone; and (d) determining one or more words spoken by at least one of a plurality of occupants using the modified speech.

13. The method of claim 12, wherein the determining step (b) is carried out by receiving manual input from the at least one vehicle occupant.

14. The method of claim 12, wherein the determining step (b) is carried out by processing the received speech signals.

15. The method of claim 12, wherein the plurality of microphones includes at least one of: a plurality of speech microphones or a plurality of active noise control microphones.

16. The method of claim 15, wherein step (b) includes determining the at least one active communication zone in response to relative strength of the speech signals received from among the plurality of speech microphones.

17. The method of claim 12, wherein step (b) includes determining a plurality of active communication zones in which occupants corresponding to the active communication zones are speaking.

18. The method of claim 12, wherein step (b) includes modifying speech processing by adjusting a hands-free algorithm, wherein the hands-free algorithm is adjusted by application of parameters tuned specifically for the determined active communication zone.

19. The method of claim 12, wherein step (b) includes modifying speech processing by adjusting a hands-free algorithm, wherein the hands-free algorithm is adjustable for any configuration of the plurality of zones.

20. The method of claim 19, wherein step (c) includes switching between application of tuned hands-free algorithm parameters for a plurality of zones in response to the determined active communication zones.

21. The method of claim 12, wherein step (c) includes modifying speech processing by processing speech signals received from only the determined active communication zone.

22. A computer program product embodied in a non-transitory computer readable medium having stored there on instructions usable by a computer processor of a speech processing system to cause the system to implement steps of a method according to claim 12.

23. A method of speech processing for a vehicle having a plurality of zones, comprising:

(a) receiving speech from at least one vehicle occupant via a plurality of microphones corresponding to the plurality of zones in the vehicle, wherein the microphones convert the speech into speech signals;

(b) determining at least one active communication zone in which the at least one vehicle occupant corresponding to the active communication zone is speaking; and (c) modifying speech processing in response to the determined active communication zone;

wherein the plurality of microphones includes a plurality of speech microphones that convert vehicle occupant speech into the vehicle occupant speech signals and a plurality of active noise control microphones that convert vehicle noise into vehicle noise signals, and wherein the speech signals are processed in response to the vehicle noise signals.

24. The method of claim 23, wherein step (c) includes processing the speech signals using the vehicle noise signals to reduce vehicle noise in the speech signals.

25. The method of claim 23, wherein step (c) includes adjusting a microphone mode in response to the received noise signals to reduce vehicle noise in the speech signals.

26. The method of claim 25, wherein step (c) includes deactivating at least one of the plurality of speech microphones.

27. The method of claim 25, wherein step (c) includes switching between microphone parameters in response to the noise signals to improve a signal to noise ratio.

* * * * *